United States Patent [19]
Dickinson et al.

[11] Patent Number: 5,688,405
[45] Date of Patent: Nov. 18, 1997

[54] METHOD AND APPARATUS FOR SEPARATING PARTICULATE MATTER FROM A FLUID

[75] Inventors: Stuart C. Dickinson, Bristol; Robert Kuklinski, Portsmouth, both of R.I.

[73] Assignee: The United States of America as represented by the Secretary of the Navy, Washington, D.C.

[21] Appl. No.: 613,771

[22] Filed: Feb. 28, 1996

[51] Int. Cl.[6] ............................................. C02F 1/36
[52] U.S. Cl. .......................... 210/748; 210/170; 366/127; 367/131
[58] Field of Search ...................... 210/748, 243; 366/127; 406/198; 210/747, 170; 367/131

[56] References Cited

U.S. PATENT DOCUMENTS

| | | | |
|---|---|---|---|
| 4,055,491 | 10/1977 | Porath-Furedi | 210/19 |
| 4,346,011 | 8/1982 | Brownstein | 210/748 |
| 4,398,925 | 8/1983 | Trinh et al. | 55/15 |
| 4,759,775 | 7/1988 | Peterson et al. | 55/15 |
| 4,877,516 | 10/1989 | Schram | 209/155 |
| 5,006,266 | 4/1991 | Schram | 210/748 |
| 5,085,783 | 2/1992 | Feke et al. | 210/748 |
| 5,225,089 | 7/1993 | Benesetal | 210/748 |

Primary Examiner—Cynthia L. Nessler
Attorney, Agent, or Firm—Michael J. McGowan; James M. Kasischke; Prithvi C. Lall

[57] ABSTRACT

A method and apparatus for filtering particulate matter entrained in a fluid entering a port from a reservoir. First and second ultrasonic wave generators produce ultrasonic waves to define a composite wave pattern. The patterns produce nodes and antinodes in a region through which fluid entering a port passes. The particulate matter in the portion of the fluid passing through the region accumulates along the nodes and antinodes. The accumulating particulate matter is thereby separated and is displaced from the fluid entering the port.

20 Claims, 7 Drawing Sheets

METHOD AND APPARATUS FOR SEPARATING PARTICULATE MATTER FROM A FLUID

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED PATENT APPLICATIONS

The instant application is related to U.S. patent application Ser. No. 08/613,771, filed Feb. 28, 1996 entitled "Method and Apparatus for Separating Particulate Matter from a Flowing Fluid".

BACKGROUND OF THE INVENTION (1) Field of the Invention

This invention relates to displacement of particulate matter suspended within a fluid and more particularly to a method and apparatus for ultrasonically and selectively displacing particulate matter suspended in a fluid to provide a filtered fluid.

(2) Description of the Prior Art

Fluid sources often comprise a fluid reservoir containing a fluid with entrained or suspended particulate matter and a port for drawing fluid from the reservoir. Such ports are generally found in a defined surface structure in reservoirs of quiescent water, such as at the bottom of a lake or pond or at the bottom of a tank. The fluid in such reservoirs often contain suspensions of organic and inorganic particulate matter. Frequently, however, the fluid entering or drawn into the port must be free of such particulate matter. Consequently various methods and apparatus for separating particulate matter from fluids are well known.

For example, in some applications, ports which draw fluid from a reservoir of water frequently include a screen or mesh filter over their openings to inhibit particulate matter from entering the port with the water. However, mesh filters generally cause a pressure drop across the port. For example, a static system relies on the pressure of the fluid in the reservoir to urge fluid into the conduit; and in a dynamic system a pump forces fluid into the conduit through the port and the filter. In either system, the pressure drop will increase over time as the filter removes particulate matter. In a static system increases in pressure drop reduces flow rates; in dynamic systems either the flow rate reduces or pumping power must increase until the flow rate through the filter reaches an acceptable valve. At some point it is even possible for particulate matter to transfer through the filter thereby degrading the quality of the water emerging from the filter. Consequently, it becomes necessary to clean the filter periodically; and in many applications such maintenance is difficult to perform.

It has also been proposed to use ultrasonic or acoustic energy as a medium for separating particulate matter from liquid. filters. For example:

U.S. Pat. No. 4,055,491 to Porath-Furedi discloses a method and apparatus for removing microscopic particles from a liquid medium by using ultrasonic waves generated in the fluid medium. A generator propagates ultrasonic waves of over 1 MHz in a horizontal direction through the medium to cause flocculation of the particles at spaced points. Baffle plates, disposed below the level of propagation of the wave provide high resistance to horizontal propagation therethrough of the ultrasonic waves and low resistance to vertical settling of the flocculated particles. Periodic energization of the generator is used to flocculate the particles; de-energization permits the settling of the flocculated particles to the baffle plates for removal from the fluid.

U.S. Pat. No. 4,346,011 to Brownstein discloses a clarifying apparatus and process for separating particulate matter from a fluid within a chamber. A transducer induces a continuous particulate removing action from a filtering screen separating the chambers receiving the liquid such that the fluid in the second chamber is free of particulate matter and the ultrasonic energy agglomerates the particulate matter trapped by the screen to maintain the screen in a clean condition.

U.S. Pat. No. 4,398,925 to Trinh et al. discloses a method for removing bubbles from a liquid bath, such as molten glass to be used for optical elements. Larger bubbles are first removed by applying acoustic energy of a frequency suited to the container of the liquid. The selected acoustic energy resonance drives the bubbles toward a pressure well for coalescence with other bubbles to enhance removal from the liquid. Smaller bubbles are then removed by applying an acoustic energy of a resonant frequency suitable for small bubbles to oscillate and thereby stir the liquid to facilitate the break up and absorption of such bubbles within the liquid.

U.S. Pat. No. 4,759,775 to Peterson et al. discloses a method and apparatus for controlling the movement of particles having different physical properties when one of the materials is a fluid. First and second acoustic waves propagate through a vessel containing the materials with the frequency of the waves being different so that the two acoustic waves are superimposed upon each other. The super position of the two waves creates a beat frequency wave with pressure gradients dividing the vessel into regions of maximum and minimum pressure. The regions of pressure move through space at a group velocity. The movement of the gradients and regions act upon the materials so as to move one of the materials toward a pre-determined location in the vessel so that by selective appropriate frequency differences one of the materials can be controllably moved to a selected aggregating location within the vessel.

U.S. Pat. No. 4,877,516 to Schram discloses a method for manipulating particulate matter by generating an acoustic standing wave with nodal planes of varying energy density in a fluid medium. Particles in the fluid medium responsive to the acoustic energy of the standing wave accumulate at these nodal planes so that in conjunction with the fluid viscous force and field forces acting in the direction of the nodal planes, movement of particles held at these planes can be controlled. The attenuation of the acoustic beams producing the standing wave do not affect the action of this method due to the imbalance of the acoustic forces that tend to be perpendicular to the movement of the particles in the nodal wave direction.

U.S. Pat. No. 5,225,089 to Benes et al. discloses a method and apparatus for separating dispersed particles in a medium by generating an ultrasonic standing wave. Specifically a composite resonator is disposed in a vessel containing the medium. The resonator generates a characteristic frequency wave with an amplitude slightly smaller than the upper threshold amplitude so that the pressure forces on the dispersed particles are equivalent to longitudinal holding forced on the particles. Thus the particulates tend to congregate at nodes and antinodes of the standing wave.

Prior art efforts therefore have generally been directed; either to mechanical filters that impede both the flow of the particulate matter and the fluid or to ultrasonic apparatus and methods that tend to be limited to relatively small confined fluid bodies. None of this apparatus, however, provides a relatively simple and efficient method and apparatus for filtering particulate matter from a fluid drawn from a large body of the fluid through a port by displacing the particulate matter from the fluid entering the port. There is no disclosure of self-cleaning methods and apparatus for filtering particulate matter from the portion of the fluid drawn into a port from a large body of such fluid. Moreover, there is no disclosure of any method and apparatus for filtering water flowing from a large reservoir into an inlet port without an associated pressure drop.

SUMMARY OF THE INVENTION

An object of this invention is to provide a method and apparatus for ultrasonically filtering particulate matter suspended within a fluid.

Another object of this invention is to separate particles suspended in a fluid from a selected portion of the fluid.

Yet another object of this invention is to provide a method and apparatus for acoustically separating particles suspended in a fluid from a portion of the fluid entering a port from a reservoir whereby fluid passing through the port is substantially free of such particulate matter.

Still another object of this invention is to provide a method and apparatus that separates particulate matter from a fluid without any need for a physical filter with its attendant clogging problems and maintenance requirements.

Yet still another object of this invention is to provide a method and apparatus for filtering particulate matter from a fluid without introducing a pressure drop.

A further object of this invention is to provide a method and apparatus for removing particulate matter from a fluid entering an inlet port from a large reservoir containing particulate matter suspended in the fluid.

Yet a further object of this invention to provide a method and apparatus for delivering a flow of relatively clear water ultrasonically filtered of particulate matter to a cooling water inlet system.

According to this invention a method and apparatus for filtering particulate matter from fluid entering a port from a reservoir comprises generating first and second ultrasonic waves and superposing the first and second ultrasonic waves to define a composite wave in the reservoir adjacent the port in a region through which the fluid enters the port. The defined composite wave urges particulate matter entrained in the fluid passing through the region away from the port so fluid entering the port from the reservoir is substantially free of such particulate matter.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
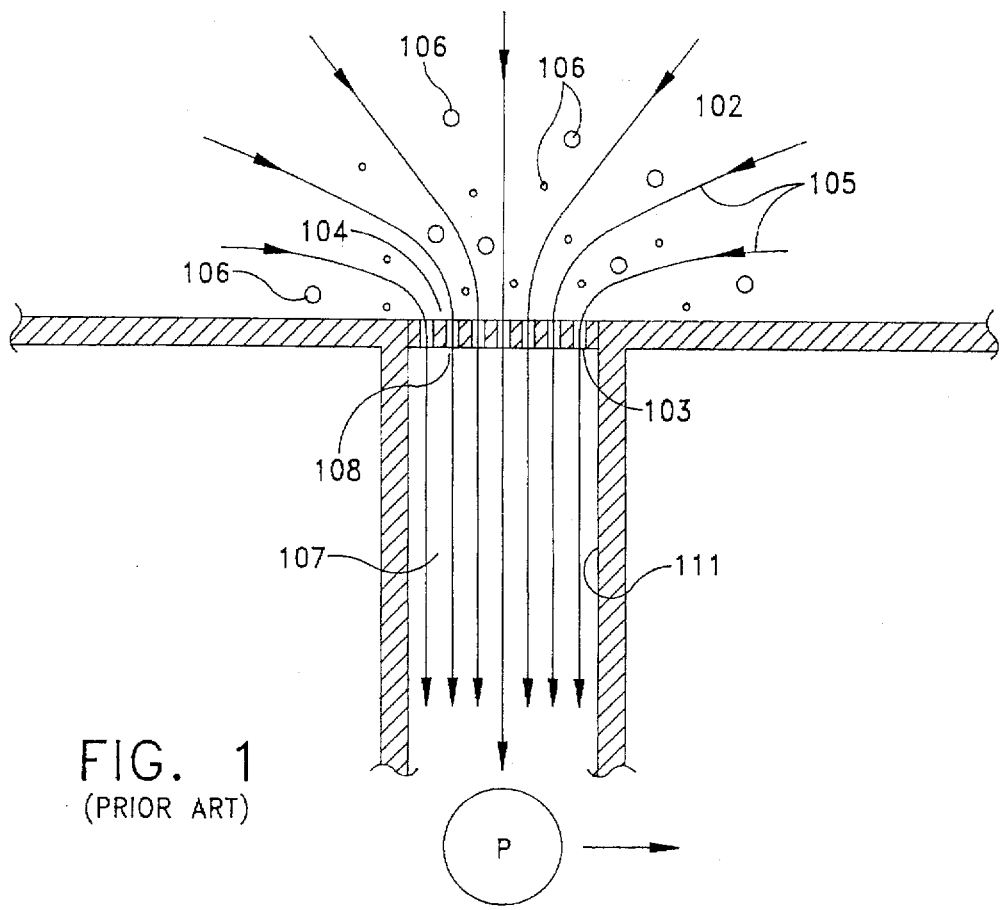
FIG. 1 diagrammatically illustrates a prior art filtration system.

As background for an understanding of this invention, FIG. 1 illustrates a prior art system for filtering a fluid entering a conduit 101 from a body or reservoir of the fluid 102. The fluid passing through a port 103 at the extreme end of the conduit 101 is graphically depicted as moving along streams of flow, represented by stream lines 105 within the fluid body 102. Particulate matter 106 suspended in the fluid body 102 also tends to move with that portion 107 of the fluid 102 flowing into the conduit 101 through port 103. A mesh filter or grate 108 overlying the port 103 arrests the transit of the particulate matter 106 having a nominal diameter greater than that of the gauge of the filter 108 at the port 103.

Figure 2:
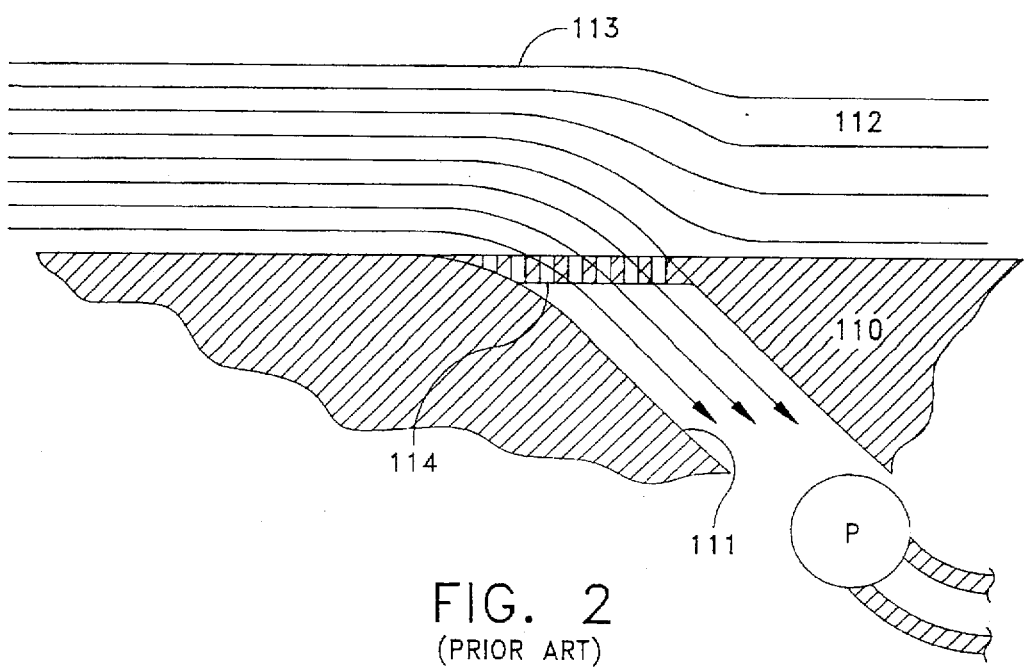
FIG. 2 diagrammatically illustrates a prior art filtration system similar to FIG. 1.

FIG. 2 depicts a system with relative movement between an object 110 with a port 111 and a fluid 112, such as water intake in flowing river or in the hull of a moving ship. In this case, stream lines 113 in the fluid initially parallel the object surface and then divert toward the port 111. A mesh filter 114 in this instance also suffers from the same problems as the filter 108 in FIG. 1. That is, the filter 114 can clog with particulate matter so as to require periodic cleaning. Moreover, the filter 114 even when clean, still causes the pressure drop, albeit less than when partially clogged.

Figure 3:
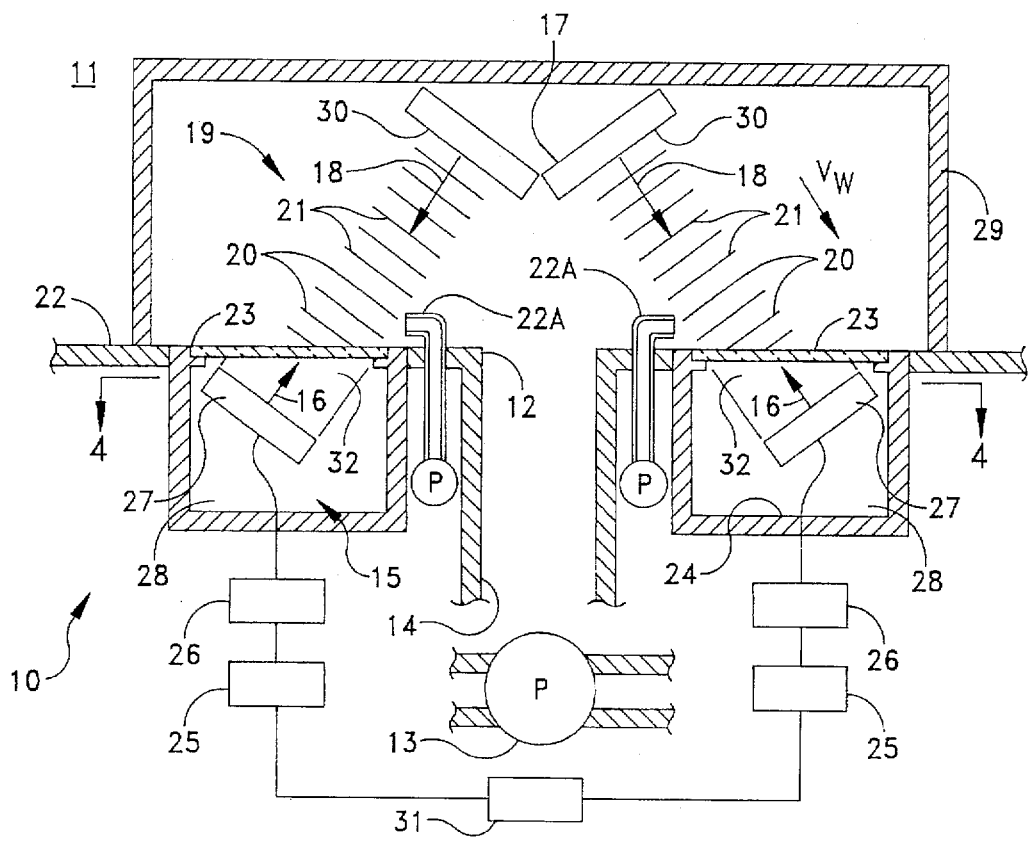
FIG. 3 diagrammatically illustrates a side view in elevation and partial section of an embodiment of this invention.

Referring now to FIG. 3, apparatus 10 constructed in accordance with this invention filters particulate matter from a relatively large body or reservoir of fluid 11, such as water. In this embodiment a portion of the fluid 11 flows into a port 12 connected to a pump 13 through conduit 14. An ultrasonic generator 15 produces an ultrasonic wave pattern that travels along a path 16 to an acoustic reflector 17 disposed in the fluid body 11 and spaced from the port 12. The reflector 17 in this embodiment acts as a second ultrasonic wave generator and reflects the ultrasonic wave pattern transversely along path 16 to produce a second ultrasonic wave pattern that travels in the opposite direction 18. The ultrasonic wave patterns superpose in a region 19 of the fluid 11.

The counter travelling wave patterns moving along the paths 16 and 18 superpose to define a composite wave pattern in the region 19 that has nodes 20 and antinodes 21 corresponding to maximum and minimum pressure gradients within the region 19. These pressure gradients urge particulate matter in the fluid 11 passing through the region 19 to accumulate along the nodes 20 or antinodes 21. Composite wave patterns formed by using the apparatus 10 tend to urge particulate matter having a radius less than half spacing of the adjacent ones of the nodes 20 and antinodes 21 (¼ the wave length of the composite ultrasonic wave pattern) toward the nodes 20 and antinodes 21. If the frequency differential is essentially zero, the reflector 17 will not change the frequency of the reflected sound 18, so a standing wave will be created. If, however, there is a relatively small frequency difference (i.e., less than 750 hz), the composite wave will be pseudo-standing wave with nodes 20 and antinodes 21 that move at a velocity $V_w \propto (f_1-f_2)$, where $f_1$ and $f_2$ represent the two frequencies. Particulate matter accumulating at the nodes 20 and antinodes 21 will thus tend to move with such nodes 20 or antinodes 21 toward a receiving surface 22 away from the port 12 where the velocity of the fluid, and thus particles borne in the fluid, toward the port is negligible.

Thus the ultrasonic wave patterns traveling along the paths 16 and 18 when produced to have substantially the same frequency produce a composite wave pattern exhibiting standing wave characteristics. That is, when the frequencies of the ultrasonic waves are substantially the same as used herein the composite wave is either a standing wave or a pseudo-standing wave. For the purposes of this application the frequencies which are substantially the same although exhibiting relatively small differences in frequencies, shall be referenced as "differential" frequencies. In this embodiment, a differential frequency between the ultrasonic wave patterns traveling in the direction 16 and 18 can be readily accomplished for example, by cycling the generator apparatus 15 through a frequency range or by changing the relative positions of the reflector and the source.

Alternatively, appropriate positioning of the generating apparatus can orient the nodes 20 and antinodes 21 substantially parallel with the directions 16 and 18. With this construction, accumulated particulate matter moves downwardly along the nodes 20 and antinodes 21 by the flowing fluid 11 through the region 19.

When this invention operates, fluid 11 at the inlet port 12 is substantially free of particulate matter. More specifically, either or both the orientation and the velocity of the nodes 20 and antinodes 21 in the composite wave pattern can be selected so particulate matter moves away from the port 12 and thereby reduces clogging. Further displacement of particulate matter can be achieved by a water jet 22A or other means that physically displaces accumulated particulate matter from the receiving surface 22 to a position even more distant from the inlet port 12.

Figure 4:
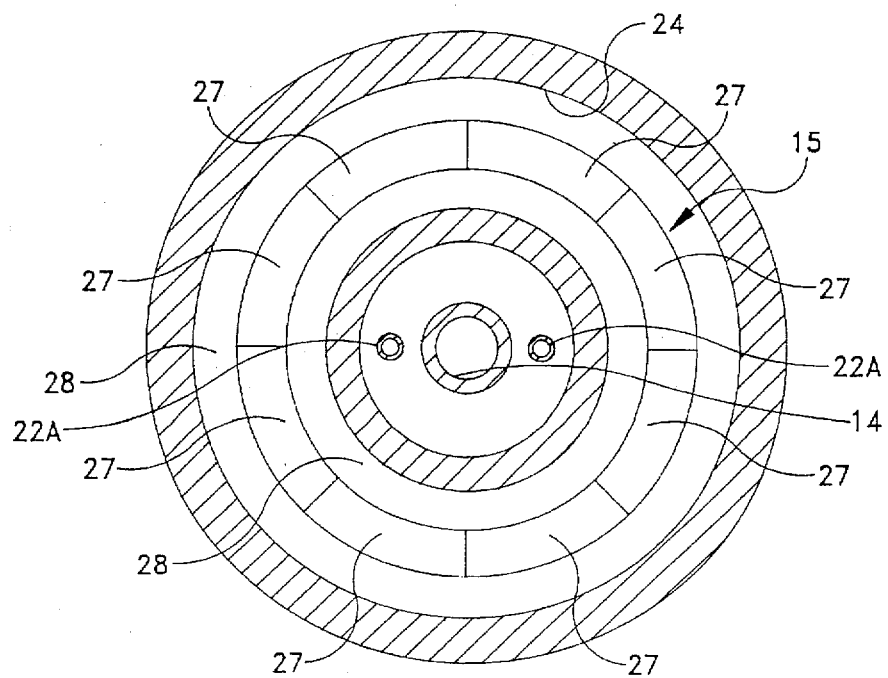
FIG. 4 is a view taken along the section line 4—4 of FIG. 3.

Referring now to FIGS. 3 and 4, the generating apparatus 15 is included beneath an acoustically transparent cover 23 within an annular chamber 24 surrounding the port 12. Frequency sources 25 energize amplifiers 26 to drive each of the transducers 27 thereby to produce the ultrasonic wave patterns that travel along the path 16. The transducers 27 are supported in the chamber 24 which includes a suitable medium 28 such as oil, acoustic foam or other medium for transmitting the generated ultrasonic wave pattern 16 to the acoustically transparent cover 23. An acoustic lens 32 is positioned on the face of each transducer 27 to match the contour of cover 23. The transducers 27 are oriented within the chamber 24 to direct the generated wave pattern 16 toward the acoustic reflector 17. The acoustic reflector 17 is supported above and spaced from the port 12 by a frame support 29 with a conical reflective surface 30 for receiving the generated ultrasonic wave pattern along the path 16 and inverting its path to generate the second ultrasonic wave pattern along the path 18. Obviously, the inventive device can be modified to accommodate different port geometries.

It is preferred to cycle the frequency of the first ultrasonic wave pattern generator upwardly through a range (e.g., 0.8 MHz to 1.2 MHz) and then revert to the low end of the range in order to vary the frequency with apparatus of minimum cost and complexity. A control apparatus 31, such as a micro-processor, connects to frequency sources 25. Those skilled in the art will appreciate that for a short time the velocity of nodes 20 and antinodes 21 will reverse as each cycle begins. However, the relative speed of the composite wave pattern and width of the region 19 can be selected so that particulate matter will not cyclically leak through the region 19. It will also be apparent that if frequency variation is used, the transducers 27 can be connected to a single amplifier 26 and frequency source 25.

Figure 5:
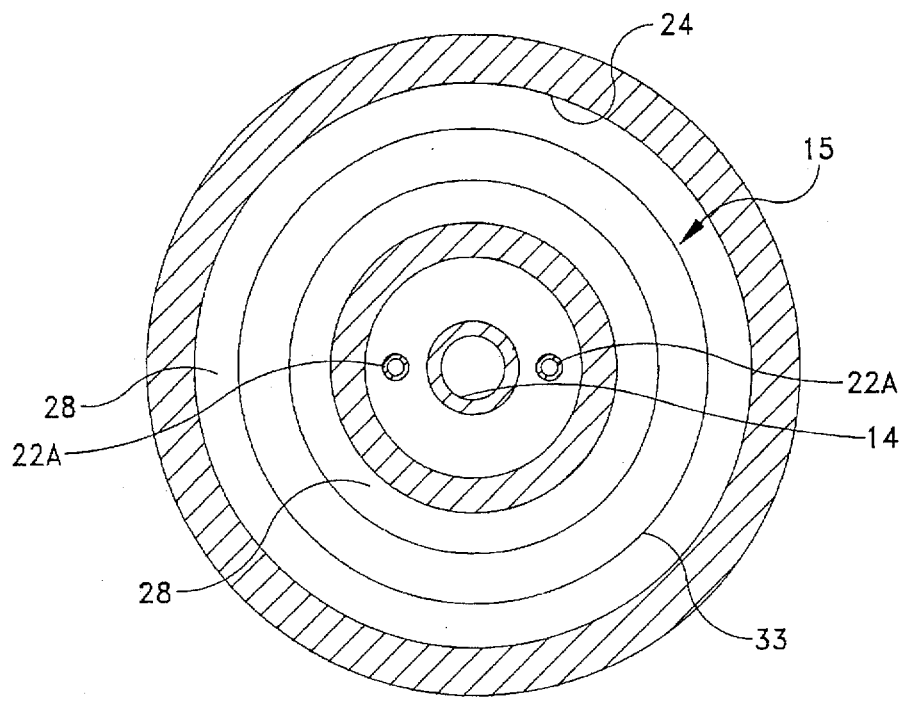
FIG. 5 is a view similar to FIG. 4 of an alternate embodiment of this invention.

FIG. 5 discloses another embodiment of this invention that includes a single annular transducer 33 that can be positioned in the chamber 24 beneath the acoustically transparent surface 23 (shown in FIG. 3). In this instance the single transducer 33 produces a wave pattern that is reflected by the reflector 17 (see FIG. 3) in substantially the same manner, as described above with respect to the transducers 27 of the embodiment of FIG. 3 to produce the composite wave in the region 19 (see FIG. 3).

Figure 6:
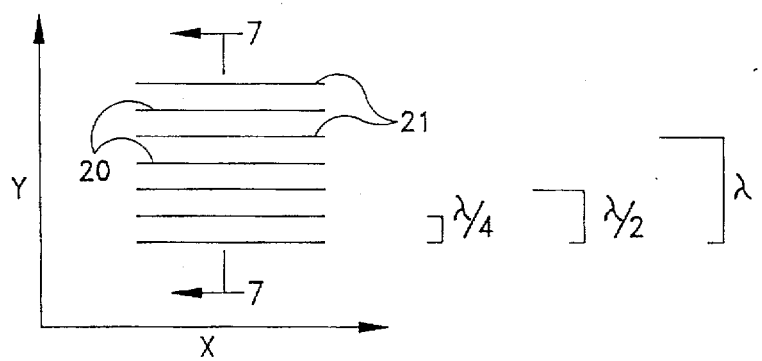
FIG. 6 is a graphical depiction of a composite wave pattern formed by the embodiment of FIG. 3.
Figure 7:
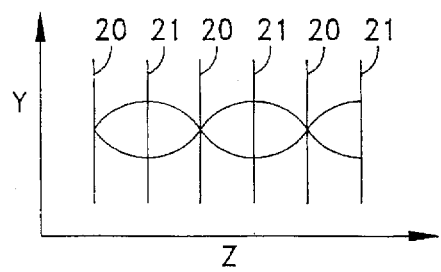
FIG. 7 is a graphical depiction taken along lines 7—7 in FIG. 6.

FIGS. 6 and 7 graphically depict a composite wave pattern formed by the superposing ultrasonic wave patterns with the nodes 20 and antinodes 21 in the region 19. The orientation of the nodes 20 and antinodes 21 according to this embodiment of the invention is a function of an angle $\alpha$, the angle of intersection defined by the intersection of the wave patterns 16 and 18. In FIG. 3 $\alpha=180°$ so the nodes and antinodes extend perpendicularly to the directions 16 and 18 of the generated wave patterns. The planar orientation of the nodes and antinodes can vary between 45° relative to the generated waves (i.e., 90° intersection of the waves) and 90° (0° and 180° intersections).

The velocity $V_w$ of the nodes and antinodes is a function of the frequency shift between the two wave patterns from the transducers operating at frequency $f_1$ and $f_2$. That is, the velocity is equal to the spacing of the fringes times the frequency shift:

$$V_w = \frac{\lambda}{2\sin\alpha}(f_1-f_2) \qquad (1)$$

where term "$\lambda$" is the wavelength at the nominal frequency.

Thus, if the frequency sources 25 in FIG. 3 cycle through a frequency range to achieve a frequency difference between the first and second ultrasonic wave patterns, the velocity $V_w$ during the cycle would be positive provided $f_1 > f_2$. Upon reaching a prescribed frequency level the frequency sources 25 would revert to a preset lower frequency and begin the cycle again. As previously indicated, this causes a momentary reversal of velocity of the composite wave pattern and an instantaneously standing wave pattern. For example, if the average frequency differential within the region 19 during a cycle is approximately 287 Hz and the ultrasonic wave patterns have a nominal wave length of 4800 microns, the average spacing between the nodes 20 and antinodes 21 would be approximately 2400 microns and the average velocity $V_w$ would be approximately 7 ft/sec or 2.1 m/sec. Thus, those skilled in the art will appreciate that an appropriate selection of differential frequencies and wavelength for the ultrasonic generated wave patterns and cycle rate will enable the system to filter substantially all particulate matter in the fluid so that the fluid reaching the port would be generally free of any particulate matter.

Figure 8:
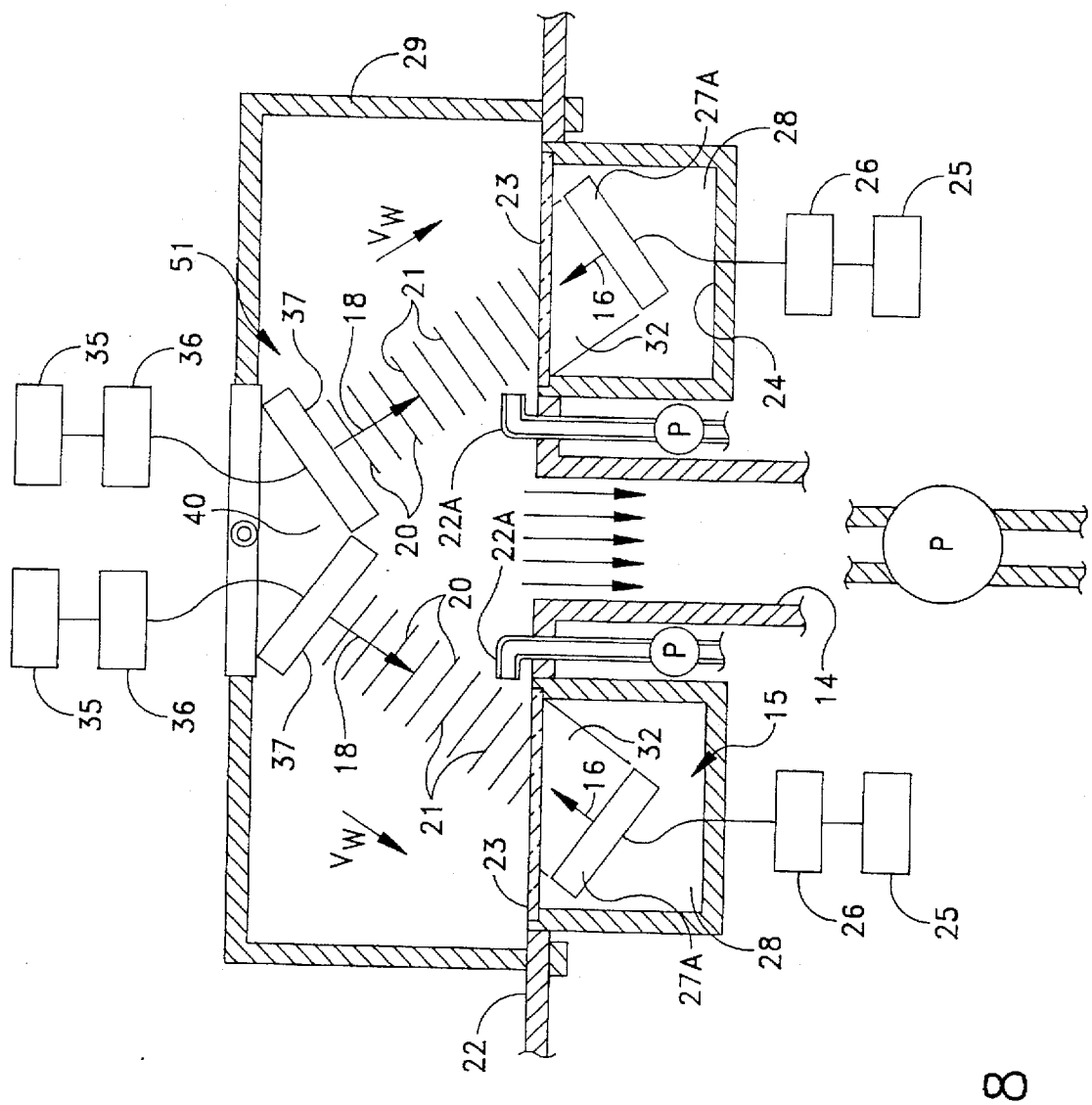
FIGS. 8 through 11 are diagrammatic views of alternative embodiments of this invention.

FIG. 8 depicts another embodiment of the instant invention is shown where the reflector 17 of FIG. 3 has been replaced with a second ultrasonic wave generator 40 substantially identical to the first ultrasonic wave generator 15. Frequency sources 35 and amplifiers 36 cause transducers 37 to produce an ultrasonic wave pattern of a different frequency than that produced by the first ultrasonic generator 15. Thus, provided the frequency of the first ultrasonic wave pattern is greater than the second, the composite wave patterns will have nodes 20 and antinodes 21 traveling at the indicated velocity $V_w$ in the region 19.

Figure 9:
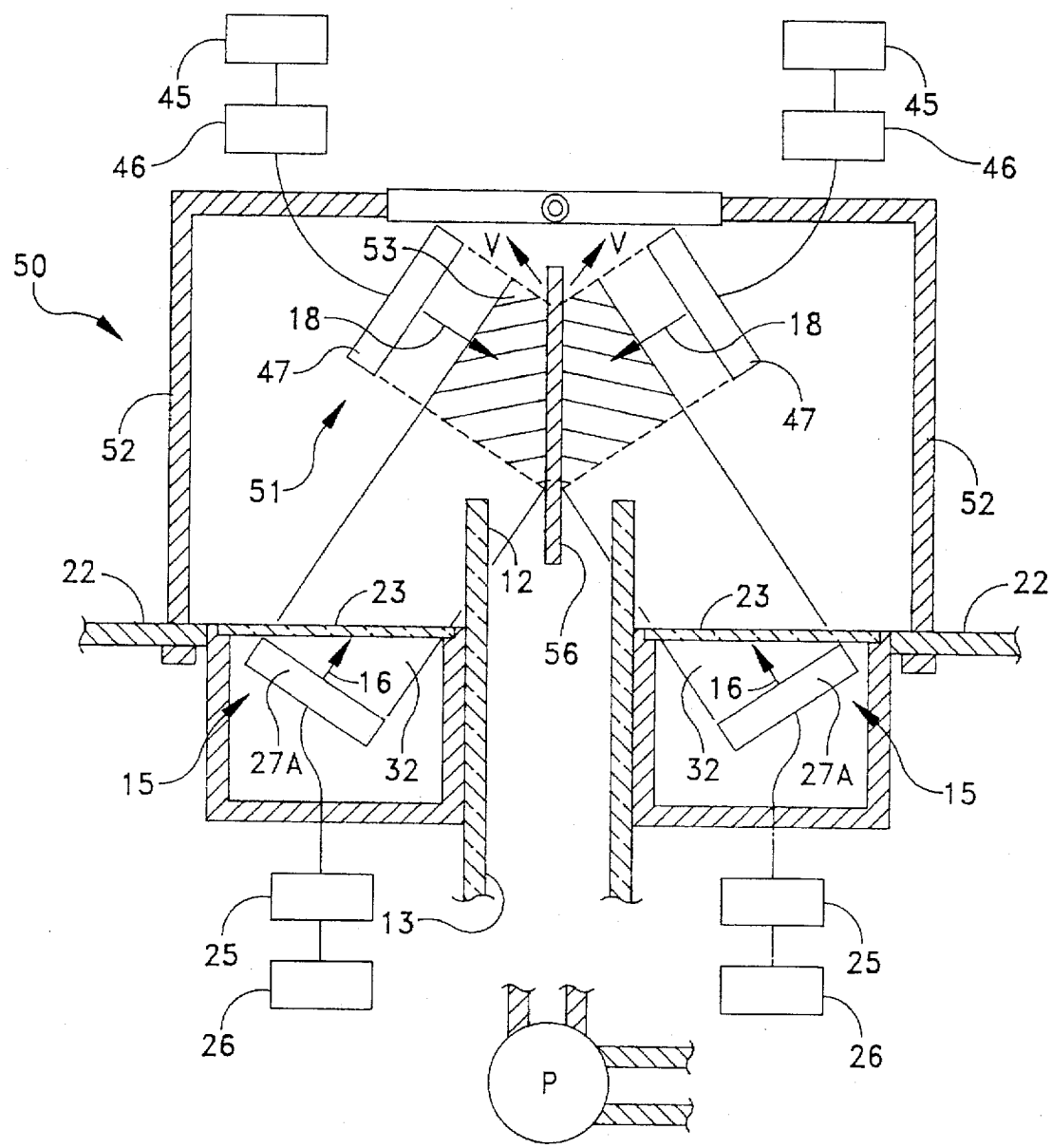

FIG. 9 depicts another embodiment of an ultrasonic filter 50 apparatus. This apparatus includes an annular transducer arrangement 51 that directs ultrasonic waves toward a port 12 extending above an object's surface 22. A structure 52 supports the annular ultrasonic wave generator apparatus with a transducer 47 arranged above the port 12 so that the composite wave forms in a region 53 above the port 12. Transducer 47 is driven by an amplifier 46 and a wave generator 45. The conduit 13 and port 12 are preferably formed of an ultrasonic transparent material so that the region 53 can be formed proximate, and even extend into the conduit 13.

The composite wave in this embodiment moves at a velocity $V_w$ that is opposite in direction to that produced with the embodiment of FIG. 3. The velocity $V_w$ in FIG. 9 has a generally upward direction to transport particulate matter away from the port 12 albeit away from the surface 22, and into the region of the fluid body remote from the port 12. The velocity $V_w$ in the upward direction occurs when the frequency sources 45 produce a higher differential frequency signal than the frequency sources 26. It will be apparent that the orientation of the nodes 20 and antinodes 21 are, as previously described, a function of the angle $\alpha$.

In this embodiment a cylindrical member 56 of a sound absorbing material is supported by the structure 52. This member 56 limits interference from the intersection of the ultrasonic wave patterns generated by the transducers 23 and 52 which could otherwise limit the effectiveness of the particulate matter to travel along such interface and thereby pass through the port 12 and into the conduit 17.

Figure 10:
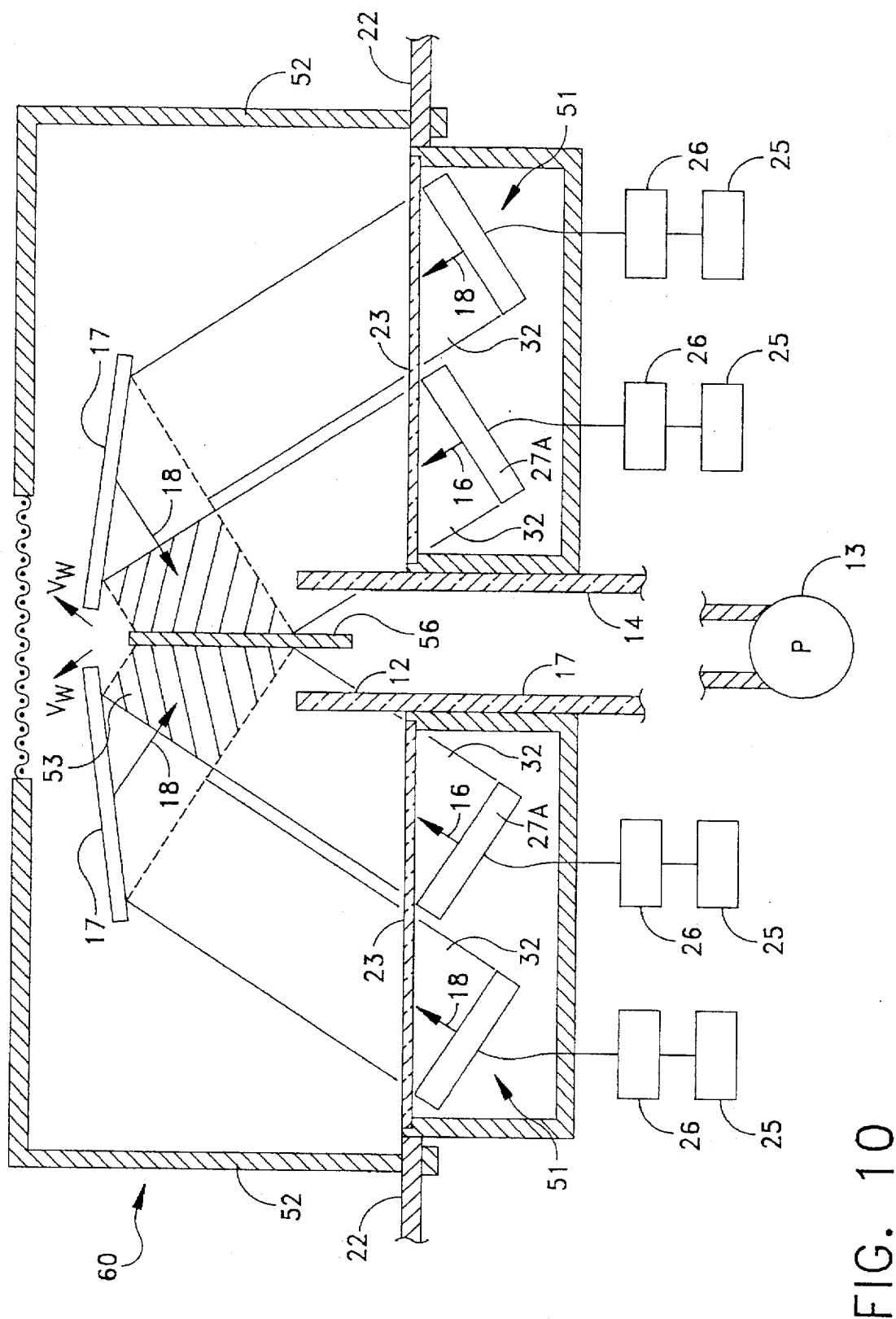

Ultrasonic filter apparatus 60 in FIG. 10 is similar to the apparatus of FIG. 9 and includes first and second ultrasonic wave generators 15 and 51 within the chamber 24. Concentric transducers 27 and 27A are positioned about the base of an extending conduit 12. The structure 52 supports an annular reflector 61 above the transducers 27 and 27A to create a composite wave pattern in the region 53 above and in the conduit 12. The transducers 27 and 27A preferably are driven at differential frequencies, as previously described, so that the velocity $V_w$ of the nodes and antinodes of the composite waves urges particulate matter entering the region 53 to a region of the reservoir 11 remote from the fluid entering the port.

Figure 11:
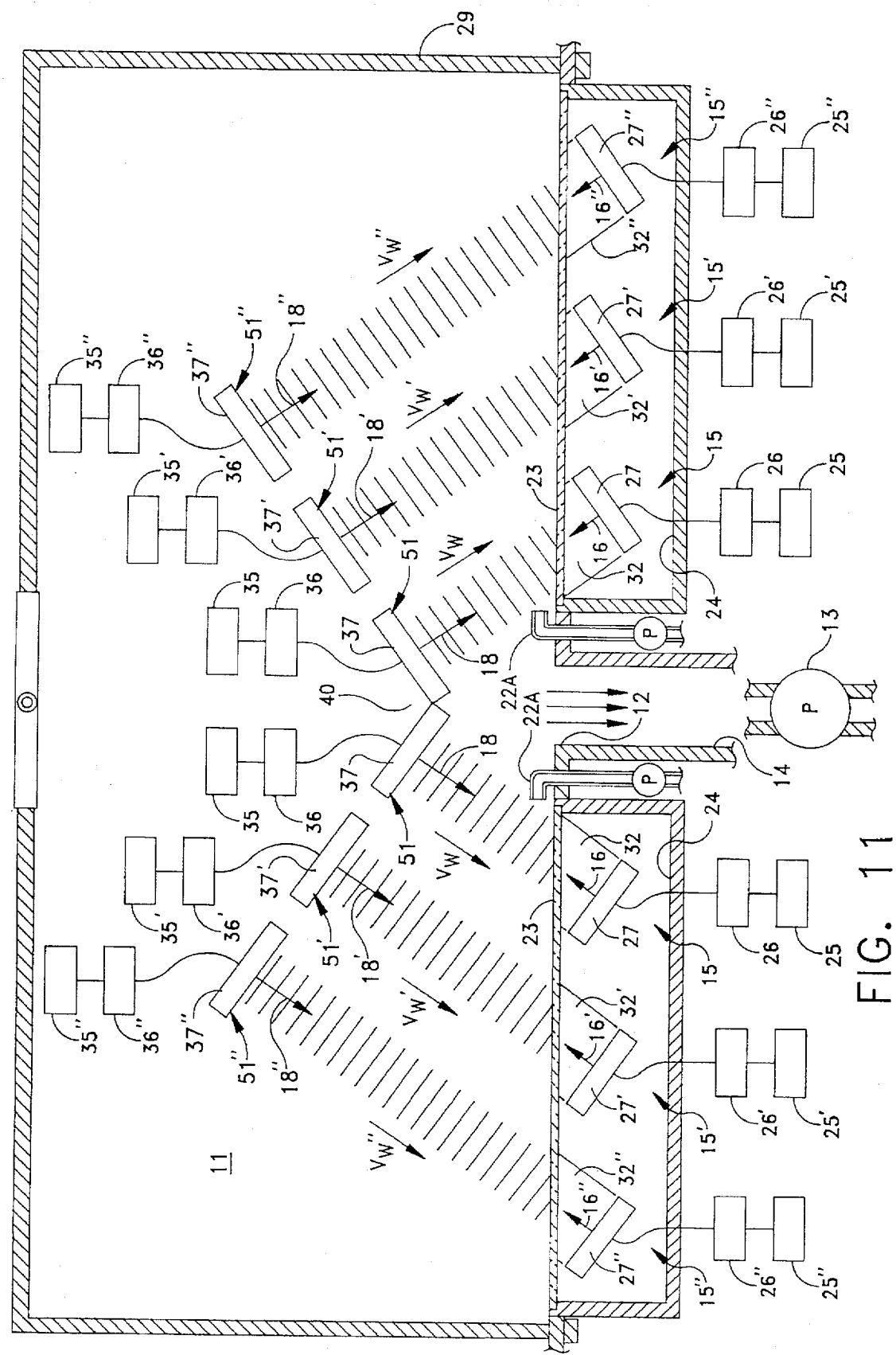

In another embodiment shown in FIG. 11, a plurality of sets of first and second ultrasonic wave generators 15 and 51, 15' and 51', and 15" and 51", are arranged in a concentric fashion about the port 12 to generate these sets of first and second wave patterns 16 and 18, 16' and 18', and 16" and 18". Each set of wave patterns are preferably generated with different nominal frequencies so that each set is optimized to filter particulate matter of different size ranges. As with the embodiment of FIG. 8, it is preferred that the first wave patterns in each of the sets of wave patterns have a frequency greater than the second corresponding wave pattern in regions 19, 19' and 19" so that the nodes 20, 20' and 20" and the antinodes 21, 21' and 21" move at velocities $V_w$, $V_w'$ and $V_w''$, respectively Consequently, particulate matter in various size ranges (e.g., approximately from 2 to 100 microns, 100 to 400 microns, and 400 to 1000 microns, respectively) can be accumulated along the nodes and antinodes in respective ones of the regions 19, 19' and 19". The moving nodes and antinodes transport this matter to a region of the fluid 11 remote from the fluid entering the port. Thus, the fluid entering the port 12 is substantially free of particulate matter.

In each of the foregoing embodiments the frequencies and energy determine the sizes of particles that will be filtered. The optimum frequency, $F_1$ for filtering a given particle for the pseudo-standing ultrasonic plane wave is given by:

$$F_{IX} = \pi R^2 \, (kR) \, \rho v_0^2 \cdot f\left( \frac{\rho_b}{\rho}, \frac{c_b}{c} \right) \quad (2)$$

$$f\left( \frac{\rho_b}{\rho}, \frac{c_b}{c} \right) = \left[ \frac{\rho_b + \frac{2}{3}(\rho_b - \rho)}{2\rho_b + \rho} - \frac{1}{3} \cdot \frac{c^2 \rho}{c_b^2 \rho_b} \right] \quad (3)$$

where:

R is the radius of the particle

K is the wave spacing of the composite wave ($K=2\pi$ over $\lambda$)

$V_o$ is the fluid's velocity amplitude which is a function of the energy of the composite wave $\rho$ is the density of the fluid $\rho_b$ is the density of the particle C is the speed of sound in the fluid $C_b$ is the speed of sound in the particle Thus, according to equation (2), the greater the difference in the densities and the speed of sound in the particle and the fluid, the easier it will be to move a particle of a given size.

It will be understood now that apparatus constructed in accordance with this invention improves the flow of filtered fluid through a port. There are no pressure drops across the port, as are encountered with systems using mesh filters. Relatively large amounts of the filtered fluid can be drawn from an essentially infinite body or reservoir of the unfiltered fluid. Adjustment of the frequency and wavelengths of the generated ultrasonic wave patterns enables users to selectively control the size of the particulate matter filtered and the rate at which the particulate matter is displaced from the fluid passing through the region in which the acoustic energy acts on the fluid.

This invention has been disclosed as a general purpose filtering apparatus for filtering particulate matter suspended in fluid entering a port from a large body of such fluid. The apparatus includes first and second ultrasonic wave pattern generators that produce superposing ultrasonic wave patterns in a region through which fluid flows as it enters a port. The second ultrasonic generator can comprise a reflector for redirecting the first ultrasonic wave pattern to form the second ultrasonic wave pattern. The wave patterns are of substantially the same frequencies which are preferably differential frequencies, as defined herein, so the nodes and antinodes of the composite wave pattern move within the region to urge particulate matter accumulating along the nodes and antinodes to another region of the fluid body remote from the port.

It will be apparent that many modifications can be made to the disclosed apparatus without departing from the invention. Therefore, it is the intent of the appended claims to cover all such variations and modifications as come within the true spirit and scope of this invention.

What is claimed is:

1. A method for filtering particulate matter of a preselected size and density from fluid passing through a port along a flow axis from a fluid reservoir, said method comprising the steps of:

generating a first ultrasonic wave pattern through the fluid entering the port;

generating a second ultrasonic wave pattern of substantially the same frequency as the first ultrasonic wave pattern through the fluid entering the port;

directing the first and second ultrasonic wave patterns along first and second directions that are oblique to the flow axis so as to superpose the first and second ultrasonic wave patterns in the fluid to define a composite wave pattern in a region through which the fluid entering the port passes from the reservoir thereby to move the particulate matter therealong and away from the port; and urging particulate matter entrained in the fluid passing through the region to a position remote from the composite wave pattern and the port such that the fluid entering the port is substantially free of such particulate matter.

2. A method for filtering as recited in claim 1 wherein said step of generating includes:

directing the first ultrasonic wave pattern along a first path;

reflecting the first ultrasonic wave pattern along a second opposite path so that the second ultrasonic wave pattern superposes with the first ultrasonic wave pattern in the region; and said urging means includes cycling the frequency of said first generating step so that the composite wave is a pseudo-standing wave.

3. A method for filtering as recited in claim 1 wherein said steps of generating include generating the first and second wave patterns with the same frequency so that said superposing defines the composite wave pattern with nodes and antinodes that are substantially stationary with respect to the port.

4. A method for filtering as recited in claim 1 wherein said steps of generating the first and second ultrasonic wave patterns includes generating the first and second ultrasonic wave patterns with differential frequencies so that the composite wave pattern has nodes and antinodes that move in a direction away from the port whereby said urging step comprises moving nodes and antinodes in the composite wave pattern that urge particulate matter in the fluid passing through a region away from the port.

5. A method for filtering as recited in claim 4 wherein said steps of generating includes generating the first and second ultrasonic wave patterns along paths that produce the composite wave pattern with the nodes and antinodes oriented at an oblique angle relative to an aperture defining the port.

6. A method for filtering as recited in claim 4 wherein said step of generating the first and second ultrasonic wave patterns includes:

generating the first wave pattern; and reflecting the first ultrasonic wave pattern to produce the second ultrasonic wave pattern.

7. A filtering apparatus, said apparatus defining means for filtering particulate matter from a fluid passing through a port disposed in a boundary surface of a reservoir, said apparatus comprising:

support means circumscribing the port whereby all fluid passing into the port passes through said support means and enters the port along a flow axis;

a first generating means disposed on said support means for generating a first ultrasonic wave of a given frequency in a first direction that is oblique to the flow axis and that travels through the fluid entering the port;

a second generating means disposed on said support means for generating a second ultrasonic wave in a second direction that is oblique to the flow axis and to the first direction and that travels through the fluid entering the port, the disposition of the first and second generating means defining means for superposing the first and second ultrasonic waves to form a composite wave with nodes and antinodes lying along axes oblique to the flow axis in a region through which the fluid drawn into the port passes for moving the particulate matter therealong and away from the port; and urging means for moving particulate matter generally collecting at the nodes and antinodes of the composite wave to a position remote from the composite wave and the port.

8. An apparatus as recited in claim 7 wherein said composite wave is a standing wave and said directing means comprises means for generating a flow in the fluid in the reservoir relative to the boundary surface.

9. An apparatus as recited in claim 7 wherein said first generating means includes a first transducer and said second generating means includes a second transducer.

10. An apparatus as recited in claim 9 wherein said second generating means further includes a reflector positioned to reflect the second ultrasonic wave into superposition with respect to the first ultrasonic wave.

11. An apparatus as recited in claim 9 wherein said urging means comprises:

a driver means connected to drive said second transducer at a second frequency different from the given frequency whereby the composite wave pattern is a pseudo-standing wave with the nodes and antinodes moving at a velocity; and orienting means for positioning said first and second transducers in a given arrangement such that the moving nodes and antinodes urge particulate matter in the fluid passing through the region away from the port.

12. An apparatus for filtering as recited in claim 11 further comprising a moving means for moving particulate matter being moved by the pseudo-standing wave away from the port.

13. An apparatus for filtering as recited in claim 12 wherein said moving means comprises a fluid jet positioned proximate the port for directing a fluid stream away from the port.

14. A filtering system, said system defining means for preventing entrained particulate matter from entering a port receiving a fluid from a reservoir along a flow axis, said system comprising:

support means circumscribing the port whereby all fluid passing into the port passes through said support means and enters the port along a flow axis;

first acoustic wave generating means disposed on said support means for generating first acoustic waves; and a second acoustic generating means disposed on said support means for generating second acoustic waves of substantially the same frequency as the first acoustic waves that, the disposition of the first and second acoustic generating means defining means for superposing the second acoustic waves with the first acoustic waves to define a composite wave in a region through which the fluid entering the port passes for urging particulate matter in the fluid passing through the region to a position remote from the composite wave and the port.

15. The apparatus as recited in claim 14 further comprising:

a surface defining a boundary within the reservoir wherein an aperture defining said port is disposed in said surface; and an acoustically transparent portion disposed in said surface through which one of the first and second waves generated by said first and second generating means passes.

16. The apparatus as recited in claim 15 wherein said first generating means includes a transducer.

17. The apparatus as recited in claim 14 wherein said first and second acoustic generating means are oriented so that the first and second acoustic waves define the composite wave with nodes and antinodes that extend through the region at an oblique angle with respect to the flow axis.

18. The apparatus as recited in claim 17 wherein said first and second acoustic generating means generates the first and second acoustic waves at the same first and second frequency such that the composite wave is a standing wave whereby particulate matter accumulating along the obliquely extending nodes and antinodes is urged by the flow of the fluid entering the port along such nodes and antinodes in a direction generally away from the port.

19. The apparatus as recited in claim 17 wherein the substantially same frequencies of said first and second acoustic waves are differential frequencies whereby said composite wave comprises a pseudo-standing wave with the nodes and antinodes moving in a given direction and urging particulate matter accumulating along the nodes and antinodes away from the port.

20. The apparatus as recited in claim 19 further comprising displacement means for moving particulate matter urged by the moving nodes and antinodes away from the port.

* * * * *